United States Patent

[11] 3,591,844

[72] Inventors Gerhard Schonebeck;
Jürgen Koehn, both of Berlin, Germany
[21] Appl. No. 670,587
[22] Filed Sept. 26, 1967
[45] Patented July 6, 1971
[73] Assignee Licentia Patent-Verwaltungs-G.m.b.H.
Frankfurt am Main, Germany

[54] ELECTRICAL APPARATUS FOR ROTATING A TURBOGENERATOR SHAFT
6 Claims, 3 Drawing Figs.
[52] U.S. Cl................................................... 290/31, 290/52
[51] Int. Cl...................................................... F02n 11/08
[50] Field of Search........................................... 290/31, 46, 52, 4, 38; 318/171, 197, 227, 231, 341

[56] References Cited
UNITED STATES PATENTS
3,264,482  8/1966  Clark et al. ............... 290/38
3,348,110  10/1967  Koppelmann ............. 318/227
3,394,265  7/1968  Hendrickson .............. 290/52 X Primary Examiner—Oris L. Rader
Assistant Examiner—W. F. Duncanson, Jr.
Attorney—Spencer and Kaye ABSTRACT: Electrical apparatus for rotating a turbogenerator or gas turbine shaft after it stops or before it starts. The apparatus comprises the generator of a turbogenerator plant used as an electric AC motor with lower frequency and electrically connected to an AC converter from normal to lower frequency. The speed of the motor (generator) may be varied, as desired, by controlling the power and frequency of the electricity supplied by the converter.

Inventors.
Gerhard Shönebeck
Jürgen Koehn 3,591,844

ELECTRICAL APPARATUS FOR ROTATING A TURBOGENERATOR SHAFT

BACKGROUND OF THE INVENTION

The present invention relates to electrical means for rotating turbogenerators used, in particular, for starting up or cooling down gas and steam turbines.

Both mechanical and hydraulic equipment has been employed in the past to crank the shafts of electric power generating plants. As is well known, however, the efficiency of this type of equipment has been low. Electrical rotating drive means, using a shaft coupling as a squirrel cage rotor to operate in a 60 cycle three-phase stator, have also been employed but without satisfactory results. Stators have had to be provided with a large number of pole pairs to meet the varying rotational speed demands of the generating plants. Even in spite of this, these known systems have operated with a high degree of heat producing slippage and with low starting torque.

SUMMARY OF THE INVENTION

An object of the invention is to provide electrical rotating drive means which are suitable for cranking turbogenerating plants of the highest power.

A further object of the present invention is to provide electrical rotating drive means which do not increase the total length of electric generating plants.

A still further object of the present invention is to provide electrical rotating drive means which operate at high efficiency at any rotational speed.

These and other objects which will become apparent in the discussion that follows are achieved by feeding a three-phase electric motor, the rotor of which forms part of the generating plant shaft, via a current, voltage and frequency controlling thyristor-static frequency converter connected to the three-phase power supply. The rotor of the three-phase motor can thus be made to rotate at any desired speed.

In one embodiment of the present invention the generator of the electric power generating plant is driven either as an asynchronous induction motor having a short-circuited rotor inductor or as a synchronous motor having a DC-excited rotor inductor. In both cases the stator will be supplied with a frequency which corresponds to the desired rotational speed. The thyristor static frequency generator, which produces this frequency, may use the set of rectifiers provided for the excitation of the generator or a special inverter-set.

In another embodiment of the invention a shaft coupling designed as a three-phase rotor and provided with a three-phase stator to form an electric motor is connected to the thyristor static frequency converter.

In order to cool down the power generating plant the motor speed, or more particularly, the motor driving frequency can be made dependent upon the temperature of the turbine casing and other physical evidences, as for instance temperature of inductor, generator r.p.m., frequency, voltage, current, steam-pressure and -temperature, shaft vibration, shaft eccentricity and casing-expansion.

DESCRIPTION OF THE PREFERRED EMBODIMENT

Figure 1:
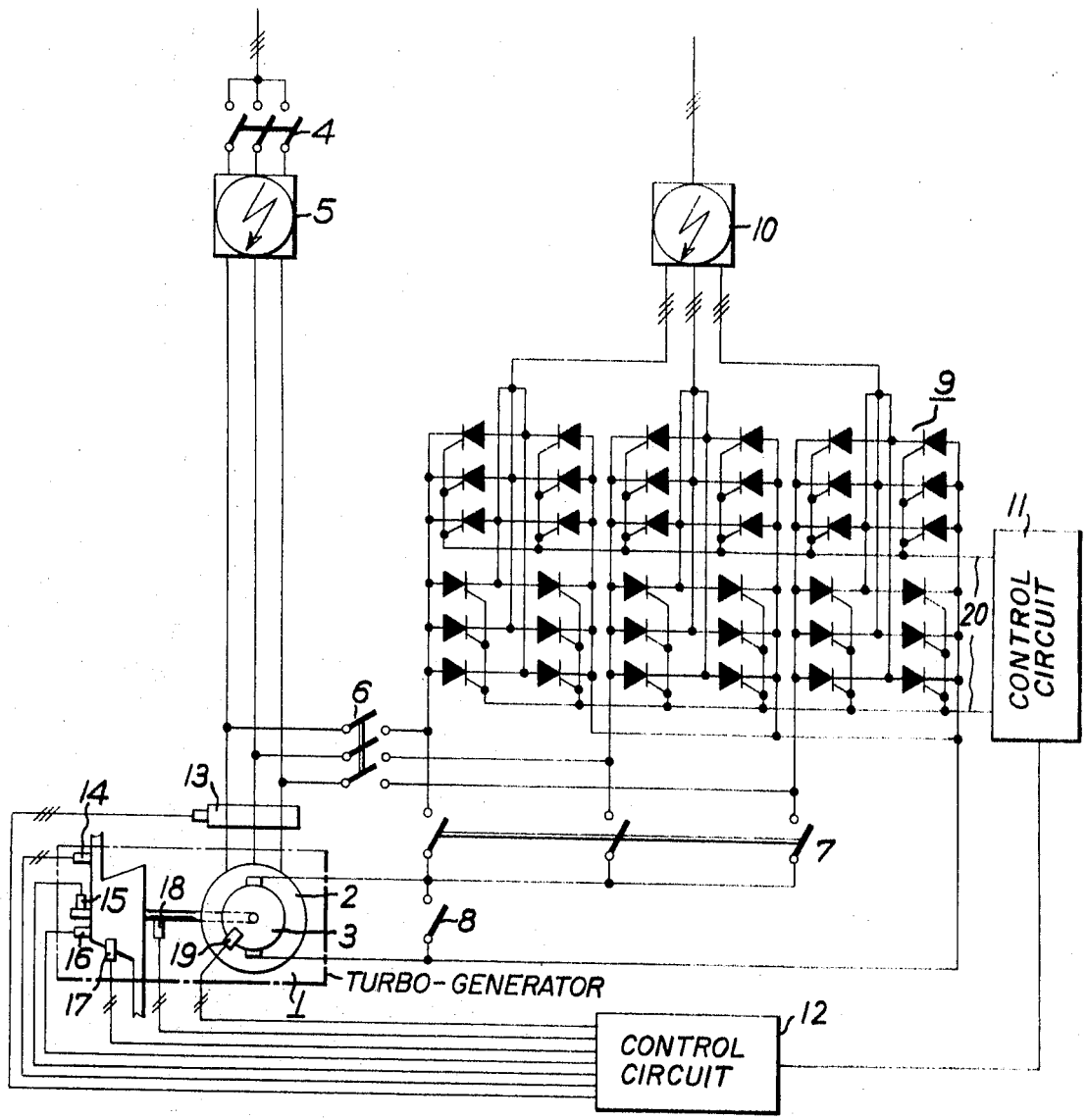
FIG. 1 is a schematic circuit diagram of one embodiment of an electrical apparatus for rotating a turbogenerator according to the present invention.

Referring now to the drawing, there is shown in the figure a turbogenerating plant 1 comprising a turbine and a generator mechanically connected together by means of a shaft. The generator, which consists of a stator 2 and a rotor 3, delivers polyphase, e.g., three-phase electrical power to a power net through the main disconnect switch 4 and in most cases also through a transformer 5. All of these elements are well known in the art.

A transformer 10 receives the generator excitation and motor driving power from an external source, e.g. from the power net, and distributes it to a bank of thyristors 9. The switches 6 and 7 serve to connect the thyristor bank 9 to the stator 2, when it functions as a static frequency converter, and to the rotor inductor 3, when it functions as a rectifier. In the former case the generator will operate as a driving motor; in the latter as a power source. A further switch 8 is provided to short circuit the rotor inductor. The thyristor firing circuit 11, controls the thyristor bank 9 constraining it to function either as a static frequency converter or as a rectifier. The thyristor-firing-circuit 11 receives its input from a control-circuit 12. This control-circuit 12 controls the rotating of the turbogenerator shaft and receives inputs from current, frequency and voltage sensors 13, steam-temperature and -pressure sensors 14, r.p.m.-sensor 15, casing expansion sensor 16 and casing temperature sensor 17, shaft eccentricity and vibration sensors 18, generator pressure and temperature sensor 19. If, as shown in the drawing, the thyristor-set also will be used as a rectifier for exciting the generator, the control-circuit embodies also the well-known circuits therefore.

When operating the generator as a power source, switches 6 and 8 are open and switch 7 closed, so that the rectifiers of each phase of thyristor bank 9 will be connected in parallel to excitation inductor 3. The thyristor bank 9, which normally operates as a rectifier providing the excitation current of the generator, must also be able to function as an invertor providing quick deenergization when and if there is a disturbance in the generating plant or in the network.

Since the turbogenerating plant is not simultaneously started and excited it may be possible to use the three-phase excitation current rectifier also for powering the rotational electric drive means. In this case the excitation rectifier is operated as a static frequency converter with a frequency characteristic matching the low frequencies required for starting up and bringing to speed the turbogenerating plant.

When operating the generator as a motor for starting the turbogenerating plant, switches 4 and 7 are open and switches 6 and 8 may be closed. Switch 8 short circuits the rotor inductor directly or with a suitable resistor (not shown). The generator can then operate as a motor to start the turbogenerating plant. The thyristor bank 9 is so controlled by the firing and controlling circuits 11 and 12 that the generator continuously receives the necessary power and frequency. It is possible to provide the stator phases of the generator with a continuously varying frequency so that the turbogenerating plant can be started with the optimum rotation for the speed characteristic.

Figure 2:
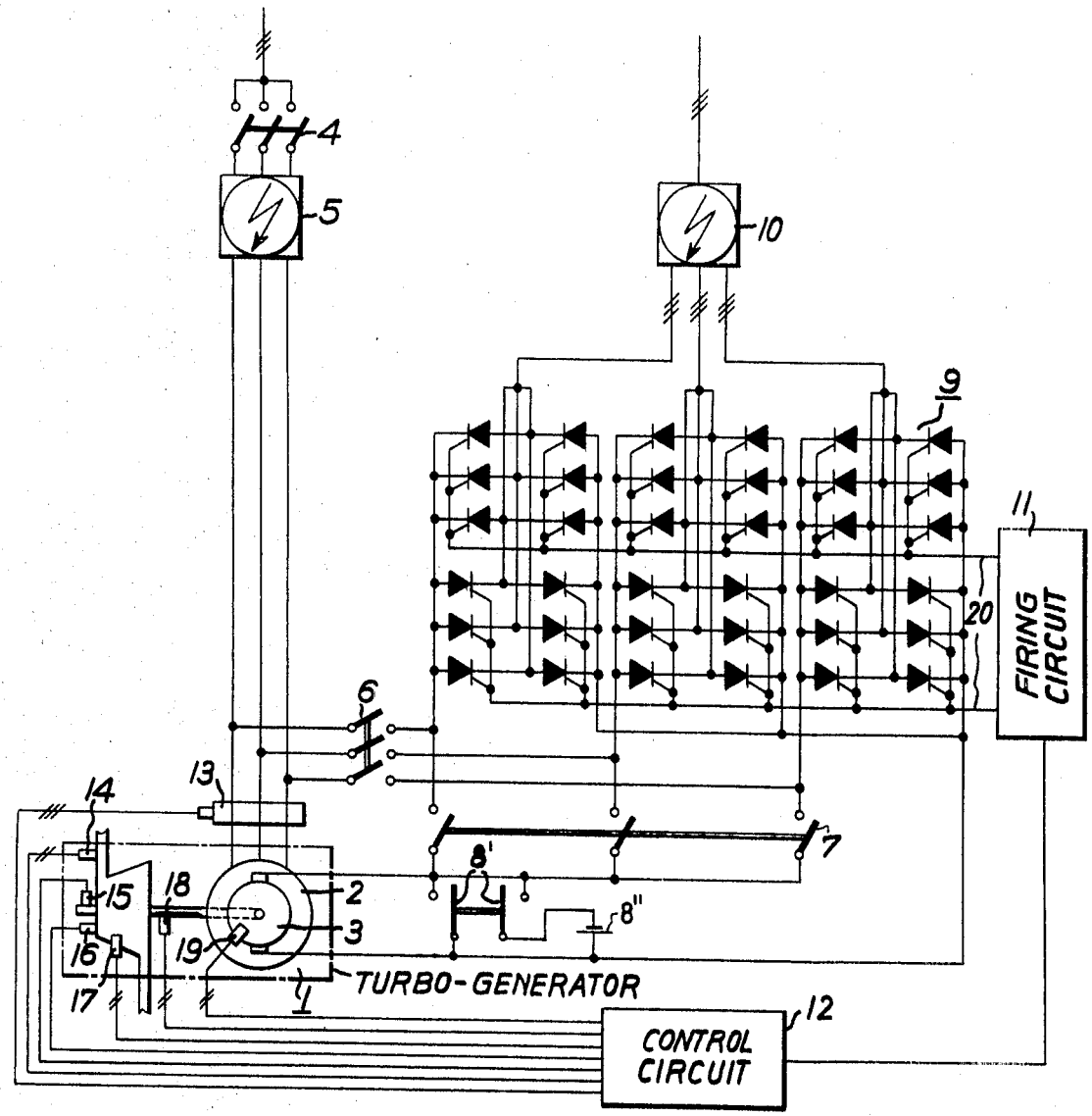
FIG. 2 is a schematic circuit of an embodiment of the present invention permitting synchronous motor operation.

FIG. 2 shows an embodiment of the present invention where the generator can be operated as a synchronous electric motor. Battery 8″, which may be of only a few volts, e.g., 1 volt energizes the rotor 3 when switch 8′ is closed to the right.

When the turbogenerating plant reaches its critical rotational speed, corresponding to a critical frequency, the electrical starting apparatus is disconnected and the generator prepared for synchronization and excitation. The process is reversed when the generating plant is shut down; that is, the generator may be automatically converted to electric motor operation when it drops below the critical rotational speed, then brought down to lower speeds under the control of the necessary frequency.

Figure 3:
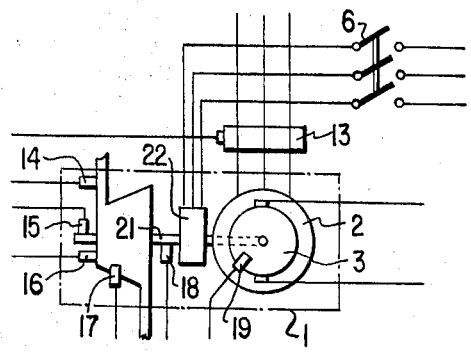
FIG. 3 is a partial schematic circuit of an embodiment of the present invention using a separate motor stator and rotor.

Instead of using the generator, the turbogenerating plant can also be driven by a three-phase motor installed somewhere along the generating plant drive shaft, as shown in FIG. 3. The shaft coupling 2, for example, can be converted to a rotor and provided with a three-phase stator 22 to form a polyphase motor. This shaft coupling is a massive iron cylinder connecting the turbine and generator. Such a motor may then also be driven at a controlled frequency by the thyristor static frequency converter. Such converted shaft couplings are well known in the art. See, for example, "The Turbine Rotating Device," AEG-Mitteilungen 54 (1964) 9/10, PP 625—629.

Mercury vapor rectifiers and other control devices may also be substituted for the thyristors shown in the preferred embodiment of the present invention. Required only is a circuit of sufficient capacity for controlling the power and frequency fed to the turbogenerator rotating mechanism.

The individual thyristors of the thyristor bank 9 are controlled by the firing circuit 11. Such firing circuits are generally applied to thyristor circuits.

If there are separate thyristor-banks for the generator excitating rectifier and the frequency inverter for rotating the turbogenerator shaft, the drawing, except switch 7, shows the latter.

One particular advantage of the present invention is that the driven member of the turbine drive shaft may be operated efficiently and at a controlled rotational speed no matter how large the turbogenerating plant. The rotational drive means according to the invention may be maintained at the optimum rotational speeds, for example, for starting up the turbogenerator or for cooling it down. When the rotating drive means is used for cooling down the turbogenerator, the turbine itself may be employed to draw cool air into itself, the amount of air made dependent upon the permissible temperature differentials within the power plant casing.

Still another advantage of the present invention is that with only minor modifications of the generating plants, the rotating drive means may be adapted to all types of turbosets. Even old turbogenerating plants may be driven with the apparatus of the present invention.

It will be understood that the above description of the present invention is susceptible to various modifications, changes, and adaptions, and the same are intended to be comprehended within the meaning and range of equivalents of the appended claims.

I claim:

1. In an electrical apparatus for rotating turbine apparatus which includes a turbine having at least one casing, a dynamoelectric machine having a rotor and a polyphase stator, a shaft connecting said turbine with said dynamoelectric machine and sensing means in said at least one turbine casing for sensing a plurality of operating parameters selected from the group comprising temperature, pressure, expansion, vibration and shaft speed to control the operation of said turbine as a function thereof, the improvement comprising a plurality of rectifier elements, said rectifier elements connected to said sensing means, to a polyphase electric power source and selectively connected to said rotor and said stator so that the dynamoelectric machine may be selectively operated as a generator and as a motor, said plurality of rectifier elements being responsive to said sensing means for varying the electrical current, voltage and frequency of the output current of said rectifier elements, whereby the turbine apparatus may both be started from standstill and brought up to a certain limiting speed by steps at any given time as a function of said at least one operating parameter and be slowed down from the certain limiting speed to standstill.

2. Electrical rotating apparatus as defined in claim 1 wherein said plurality of rectifier elements are thyristor elements which control the electrical current, voltage and frequency.

3. Electrical rotating apparatus as defined in claim 2 wherein said shaft comprises shaft sections, a shaft coupling connecting said sections together, said shaft coupling forming a motor rotor.

4. An electrical apparatus as defined in claim 3 further including a polyphase stator in cooperation with said motor rotor.

5. Electrical rotating apparatus as defined in claim 4 wherein said turbine apparatus is a turbogenerator having a turbine and a generator mechanically connected together, said generator being constituted by said rotor and said stator, said rotor having an inductor winding, there being means for short-circuiting said inductor winding thereby to allow said generator to be operated as an asynchronous motor.

6. Electrical rotating apparatus as defined in claim 4 wherein said turbine apparatus is a turbogenerator having a turbine and a generator mechanically connected together, said generator being constituted by said rotor and said stator, said rotor having an inductor winding, there being means for exciting said inductor winding thereby to allow said generator to be operated as a synchronous motor.